UNITED STATES PATENT OFFICE.

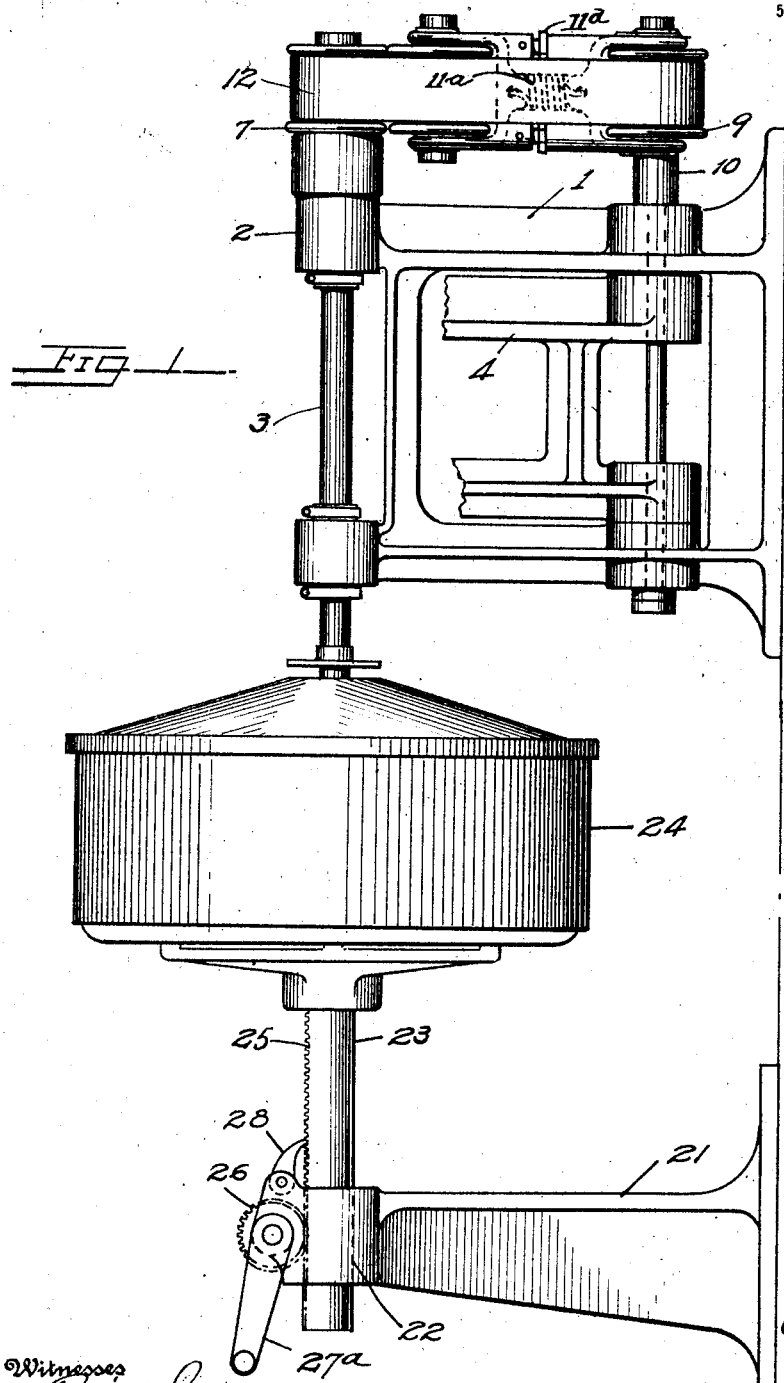

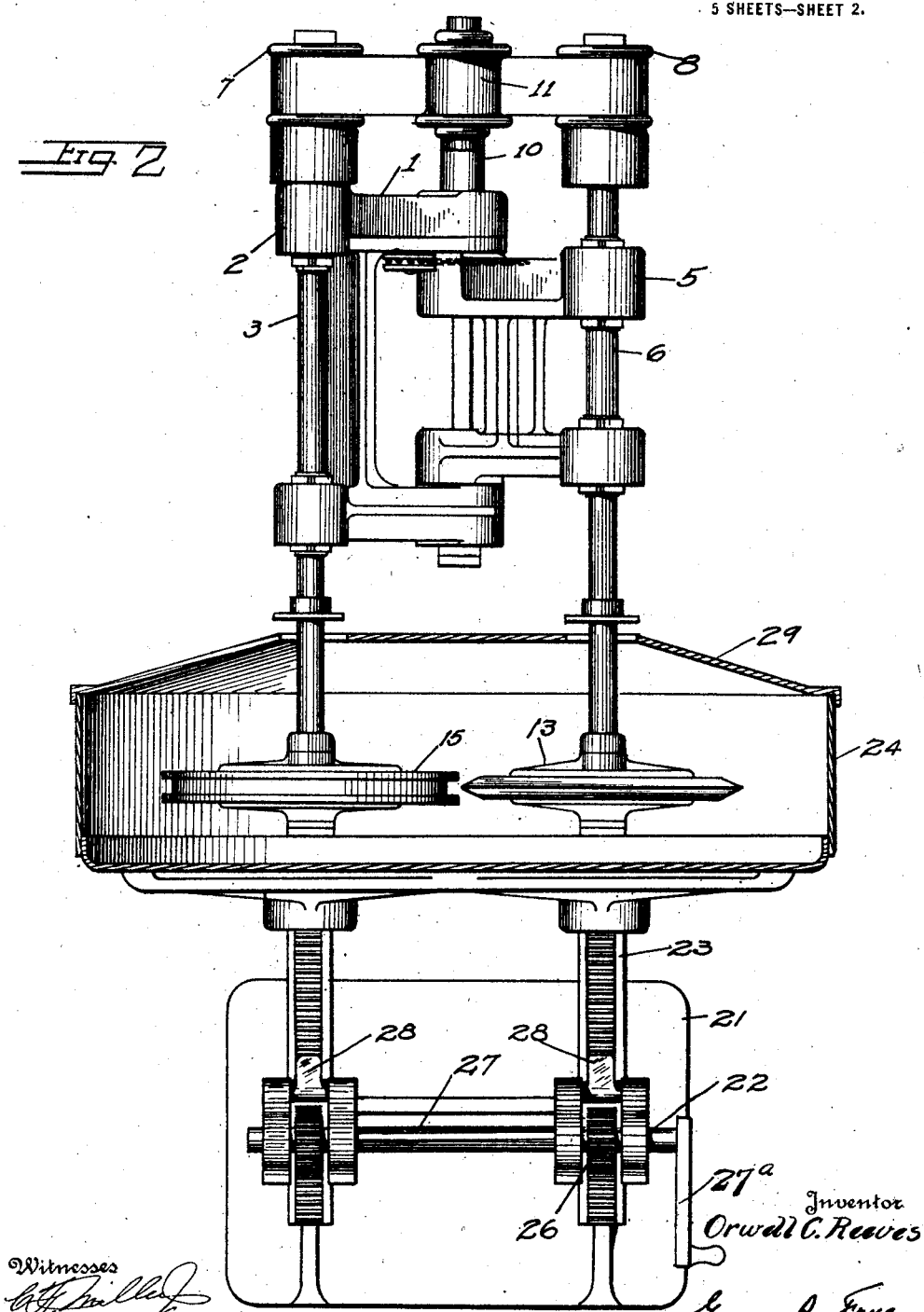

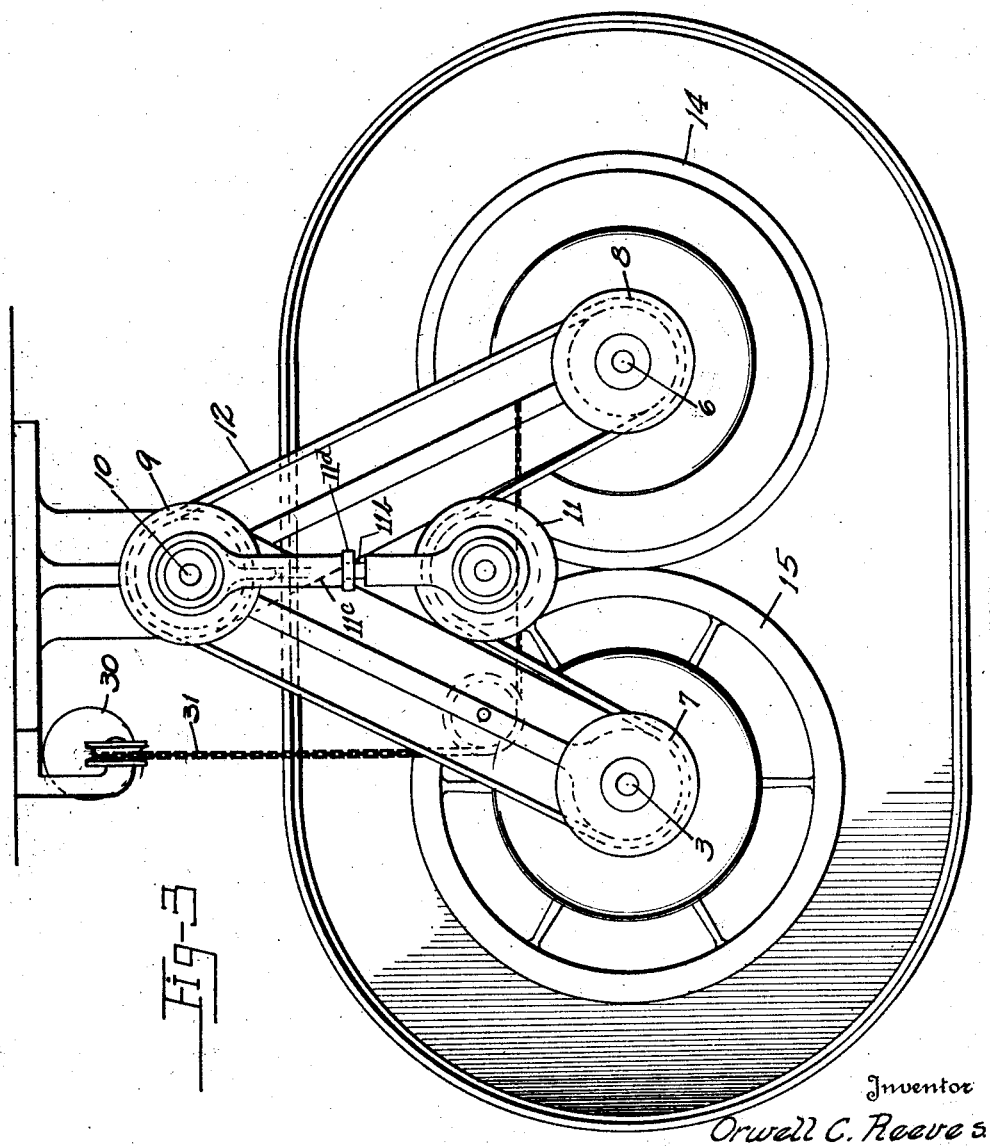

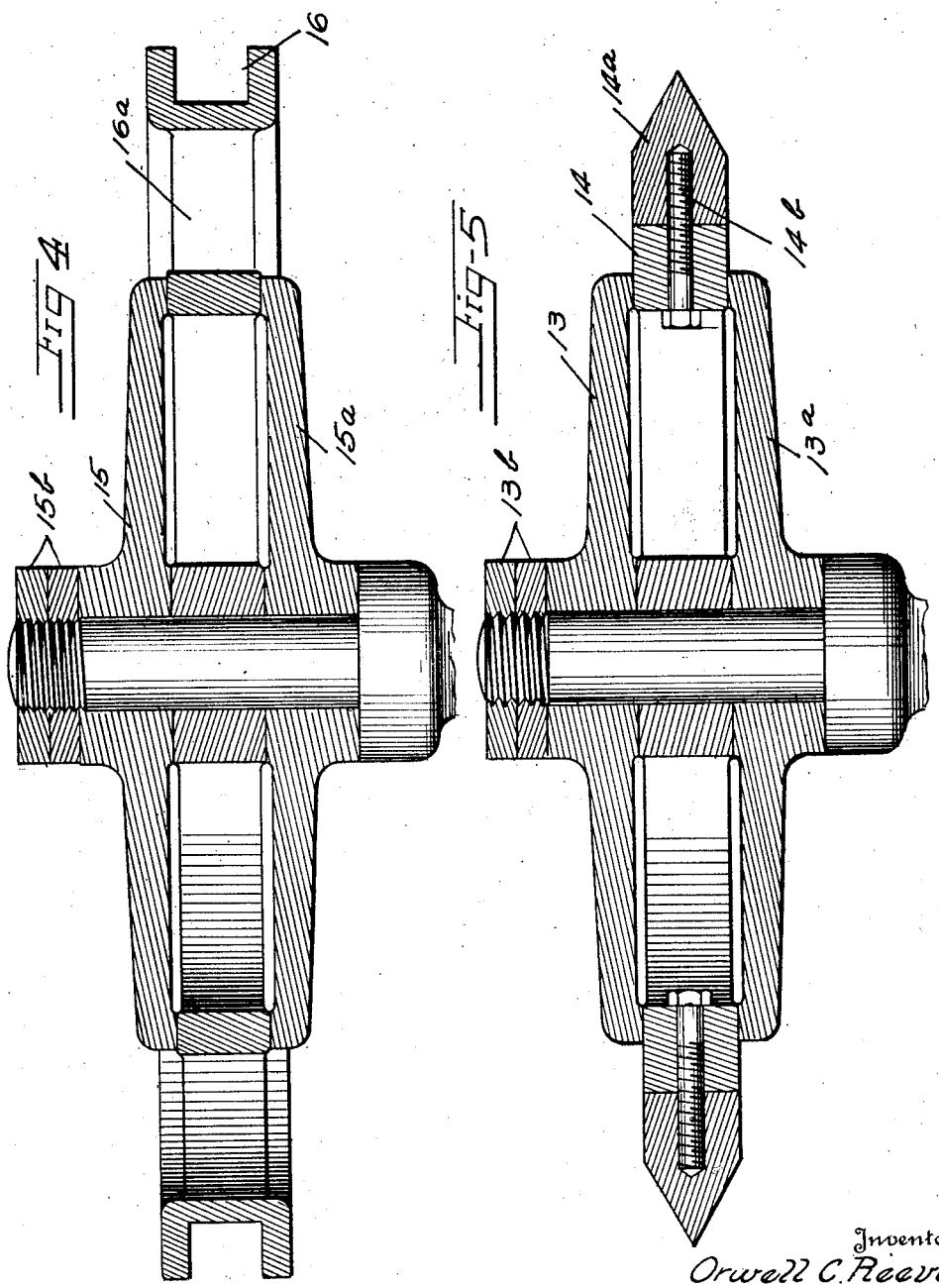

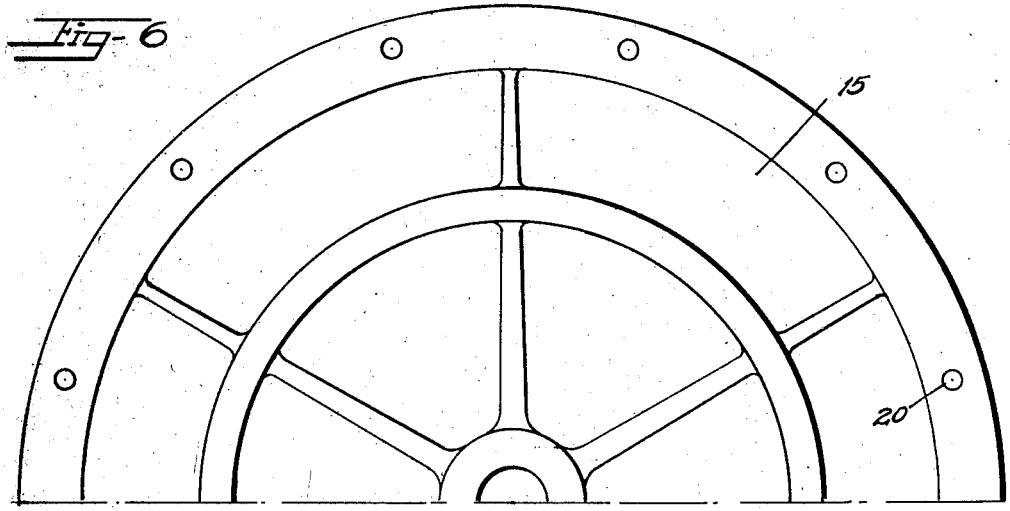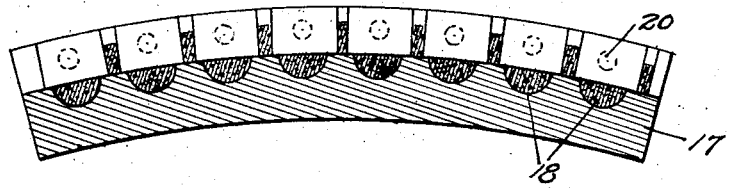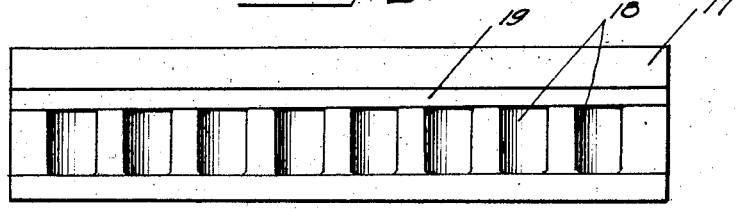

ORWELL C. REEVES, OF TOLEDO, OHIO, ASSIGNOR TO TOLEDO SCALE COMPANY, OF TOLEDO, OHIO, A CORPORATION OF NEW JERSEY.

MACHINE FOR GROOVING AGATES AND SIMILAR STONES.

1,379,044.                Specification of Letters Patent.       Patented May 24, 1921.

Application filed October 13, 1917. Serial No. 196,429.

*To all whom it may concern:*

Be it known that I, ORWELL C. REEVES, a citizen of the United States, residing at Toledo, in the county of Lucas and State of Ohio, have invented certain new and useful Improvements in Machines for Grooving Agates and Similar Stones, of which the following is a specification.

This invention relates to machines for cutting and grooving material of compartitive hardness, and more particularly to machines for the grooving of precious and semi-precious stones.

In certain of the mechanical arts, such as those relating to the development of the scale, horological and scientific instrument industries, it has been found necessary to use pivots, bearings and the like of very hard material, such as agate and other precious or semi-precious stones. Heretofore it has been the custom to import such agate bearings, etc., in great quantities from foreign countries, where the labor employed in cutting and shaping these stones by successive hand operations did not greatly affect the cost thereof. The difficulty experienced in providing a machine for grooving hard stones, such as agate, bears mainly on the coöperation of suitable cutting and holding members adapted to groove the stones in regular lines and in a sufficient number to allow the production of the agate bearings and pivots in considerable quantities.

The present invention provides an agate grooving machine adapted to simultaneously groove a number of jewel bearings of predetermined sizes and dimensions from blocks of agate or similar hard stones. Means are also provided for varying at will the number of jewel bearings to be so grooved, and for regulating the depth and lateral extent of the grooves. Preferably this machine is used for rough grinding the V-shaped grooves in agate bearings for weighing scales, the grooves being then finished in a finishing machine described in a companion application filed herewith, but it will be understood that such finishing machine is not essential in all instances and the complete grooving operation may be performed on the machine herein described.

Other objects and advantages will be apparent from the following description, taken in connection with the accompanying drawings which are illustrative of one embodiment of my invention and wherein similar reference characters designate similar parts throughout the several views.

In the drawings:—

Figure 1 is a side view of my improved machine;

Fig. 2 is a front elevation thereof with parts cut out to show the interior mechanism;

Fig. 3 is a plan view, with the cover of the abrasive fluid container removed;

Fig. 4 is a central section through the agate-holding disk;

Fig. 5 is a similar view of the rotatable cutting disk;

Fig. 6 is a fragmental plan view of the agate holding disk;

Fig. 7 is a detail sectional view through the rim of said disk, showing the method of securing the agates in the removable segments; and Fig. 8 is a plan view of one of the agate-holding segments.

Referring more specifically to the drawings, the numeral 1 designates a bracket adapted to be fixed to the side wall or post and provided with bearings 2 for rotatably supporting a vertically-disposed shaft 3, while a movable bracket arm 4 is pivotally mounted upon the bracket and is provided with bearings 5 for rotatably supporting a vertically-disposed shaft 6. Each of the shafts 3 and 6 has fixed thereto a pulley 7 and 8 respectively, while a pulley 9 loosely mounted on a shaft 10 in vertical alinement with the pivotal connection between the two bracket arms 1 and 4 is resiliently connected to a pulley 11 in horizontal alinement with the pulley 9. A belt 12 is passed around these pulleys so as to cause the shafts 3 and 6 to rotate in the same directions when power from some external source is applied. Fixedly mounted upon the lower end of the shaft 6 is a horizontally-disposed disk 13 provided with a removable ring 14 carrying a cutting ring 14ª of soft steel or like material having a V-shaped peripheral edge. Suitable fastening means, as the bolts 14ᵇ, may be used to secure the cutting ring in position, and the disk 13, hereinafter called the cutting disk, is preferably formed of oppositely-disposed sections 13ª adapted to clamp between them the ring 14 and held in position by the lock nuts 13ᵇ. Similarly, the lower end of the shaft 3 carries a horizontally-disposed disk or wheel 15 in horizontal alinement with the cutting disk 13 and is formed with a channeled periphery 16 adapted to receive a plurality of agate-holding segments 17 (see Figs. 7 and 8). The agates or similar material to be grooved may be secured in the segmental holders in any suitable manner, the method shown in Figs 7 and 8 having proved efficient in practice and consists of channeling the segments the depth of the agate blocks and forming the bottom of the channel with a plurality of spaced recesses 18 communicating at one end with a circumferentially-extending groove 19 whereby the several agates may be positioned in the segments and temporarily clamped therein by set screws 20 or the like, one agate over each recess 18. Cement is then poured in the communicating groove 19 and permitted to fill the recesses 18 and the interstices between the agates up to a desired height, substantially as shown in Fig. 7. The several segments 17 are then secured in the channel 16 of the holding disk 15 by any desired means, such as bolts or set screws. The construction of the disk 15 is substantially the same as that of the cutting disk 13, and comprises oppositely-disposed clamping disk 15$^a$ securing between them the agate-holding ring 16$^a$ and being secured in fixed position by means of the lock nuts 15$^b$ (see Fig. 4).

Mounted below the bracket 1 is a bracket 21 also adapted to be secured to the side wall or post and formed with bearings 22 adapted to receive supporting shafts 23 for a tank or similar container 24 for an abrasive solution. Any suitable solution may be utilized for this purpose, but it has been found in practice that a mixture of carborundum and emery powder maintained in a slightly viscous fluid condition is quite efficient for this purpose, and is preferred. Suitable mechanism for raising and lowering the tank 24 into and out of position for coöperating with the cutting and agate-holding disks is provided, one form as herein shown being to provide on the supporting shafts 23 rack faces 25 meshing with pinions 26 on a cross-shaft 27 (see Figs. 1 and 2). Suitable means, as a handle 27$^a$, is provided for raising or lowering the tank as desired, and the shafts 23 are locked in any desired position by suitable means, as, for example, the pawls 28. A cover 29 for the tank 24 is preferably provided to prevent the splashing of the abrasive solution during the grooving operation.

The swinging bracket arm 4 carrying the shaft 6 supporting the cutting disk is held under pressure against the agates or like material in the holding disk by means of a pendent weight 30 carried at one end of a chain or similar flexible member 31 which passes over suitable pulleys and has its opposite end secured to the bracket arm 4. Thus, despite the depth of the groove in the agates, the cutting disk is maintained in operative contact with the material to be cut. As the bracket arm 4 swings, the belt 12 is maintained taut through the travel of the pulley 11 under pull of the spring 11$^a$. The bracket in which the pulley 11 is mounted is preferably guided in its movement by spaced pins 11$^b$ telescoping within sleeves 11$^c$ upon the bracket carrying the pulley 9. By providing suitable spacers 11$^d$ upon the pins 11$^b$ the extent of travel of the pulley 11 may be controlled at will, thereby allowing the belt 12 to become loose so that turning movement of the disks 13 and 15 ceases after they have moved to within a predetermined distance of each other. Thus the depths of the grooves in the agates or similar materials may be controlled. It will be understood, however, that other means may be provided for regulating the depth of the cut.

The operation of my improved machine is obvious from the description. The agates or similar material to be cut are secured within the segments 17 which in turn are fixed within the channeled ring 16 of the holding disk, and the tank 24 containing the abrasive solution is then elevated so that both the cutting and holding disks are immersed therein. Power is then applied to rotate the pulley 9 and the shafts 3 and 6. The rotation of the disks on the shafts 3 and 6 carry the particles of emery, carborundum, etc., against the agates until a groove is worn therein to the extent desired. The disks are then stopped and the tank 24 lowered, whereupon the segmental holders 17 and the agates are removed. Should the power be applied to the pulley 9 longer than necessary, it will do no harm provided the spacers of the desired size have been pressed upon the pins 11$^b$, for the extra rotations of the pulley 9 owing to the slipping of the loosened belt will be made without turning the cutting and agate holding disks sufficiently to materially deepen the grooves in the agates.

It will be understood that the shape of the groove can be changed at will by inserting cutting rings 14$^a$ of the desired configuration.

While it will be apparent that the illustrated embodiment of my invention herein disclosed is well calculated to adequately fulfil the objects primarily stated, it is to be understood that the invention is susceptible to variation, modification and change without departing from the spirit and scope of the invention as set forth in the subjoined claims.

Having described my invention, I claim:

1. In a machine of the character described, a rotatable member adapted to carry the material to be grooved, a member having a cutting edge, and means for automatically holding the cutting edge in engagement with the material when desired.

2. In a machine of the character described, a rotatable member adapted to carry the material to be grooved, a rotatable member having a cutting edge, and means for automatically holding the cutting edge in engagement with the material when desired.

3. In a machine of the character described, a rotatable member adapted to carry the material to be grooved, a rotatable member having a cutting edge, and means for automatically adjusting one of said members toward the other to maintain the contact of the cutting edge and material, means for rotating said members, and means for rendering said rotating means inoperative after a predetermined movement of said adjusting means.

4. In a machine of the character described, a pair of rotatable members adapted respectively to carry the material to be grooved and the cutting edge, means for maintaining the contact of the edge and material, and means for preventing further cutting of the material after a desired depth of groove is cut.

5. In a machine of the character described, a pair of rotatable disks adapted respectively to carry the material to be grooved and the cutting edge, means for adjusting one of said disks toward the other to effect contact between the material and cutting edge, and means for restraining further cutting after a desired depth of groove is cut.

6. In a machine of the character described, a pair of rotatable horizontally-disposed disks adapted respectively to carry the material to be grooved and the cutting edge, and means for adjusting said disks toward each other to maintain the engagement of the material and cutting edge as long as desired.

7. In a machine of the character described, a pair of rotatable horizontally-disposed disks adapted respectively to carry the material to be grooved and the cutting edge, means for adjusting one of said disks toward the other to effect contact between the material and cutting edge, and means for restraining further cutting after a desired depth of groove is cut.

8. In a machine of the character described, a pair of horizontally-disposed rotatable disks adapted respectively to carry the material to be grooved and the cutting edge, and means for effecting a horizontal movement of one of said disks to maintain engagement between the cutting edge and material until a predetermined depth of groove is cut.

9. In a machine of the character described, a pair of horizontally-disposed rotatable disks adapted respectively to carry the material to be grooved and the cutting edge, means for effecting a horizontal movement of one of said disks to maintain engagement between the cutting edge and material until a predetermined depth of groove is cut, and means for automatically terminating relative movement of the cutting edge and material.

10. In a machine of the character described, a rotatable disk adapted to carry the material to be grooved, a vertically-disposed shaft on which said disk is mounted, a second shaft arranged parallel with the first-mentioned shaft, a disk mounted thereon and bearing a cutting edge, and means for moving one of said shafts toward the other to effect engagement between the cutting edge and material.

11. In a machine of the character described, a rotatable disk adapted to carry the material to be grooved, a vertically-disposed shaft on which said disk is mounted, a second shaft arranged parallel with the first-mentioned shaft, a disk mounted thereon and bearing a cutting edge, a swinging bracket arm adapted to support one of said shafts, and means for swinging the bracket arm to bring one disk toward the other to effect contact between the material and cutting edge.

12. In a machine of the character described, a rotatable disk adapted to carry the material to be grooved, a vertically-disposed shaft on which said disk is mounted, a second shaft arranged parallel with the first-mentioned shaft, a disk mounted thereon and bearing a cutting edge, a swinging bracket arm adapted to support one of said shafts, means for swinging the bracket arm to bring one disk toward the other to effect contact between the material and cutting edge, and means for terminating turning movement of the shafts after a desired depth of groove is cut.

13. In a machine of the character described, a rotatable disk adapted to carry the material to be grooved, a vertically-disposed shaft on which said disk is mounted, a second shaft arranged parallel with the first-mentioned shaft, a disk mounted thereon and bearing a cutting edge, a swinging bracket arm adapted to support one of said shafts, and gravity acting means for swinging the bracket arm to bring one disk toward the other to effect contact between the material and cutting edge.

14. In a machine of the character described, a rotatable disk adapted to carry the material to be grooved, a vertically-disposed shaft on which said disk is mounted, a second shaft arranged parallel with the first-mentioned shaft, a disk mounted thereon and bearing a cutting edge, a swinging bracket arm adapted to support one of said shafts, gravity acting means for swinging the bracket arm to bring one disk toward the other to effect contact between the material and cutting edge, and means for terminating turning movement of the shafts after a desired depth of groove is cut.

15. In a machine of the character described, a vessel adapted to contain an abrasive solution, a pair of rotatable members adapted respectively to carry the material to be grooved and the cutting edge, and means for raising or lowering the vessel to immerse or free said rotatable members from the abrasive solution.

16. In a machine of the character described, a pair of horizontally-mounted rotatable disks adapted respectively to carry the material to be grooved and the cutting edge, a tank adapted to contain an abrasive solution, and means for elevating or lowering the tank to immerse the disks in said solution when desired.

17. In a machine of the character described, a disk adapted to carry the material to be cut, and comprising a segmental holding means to which the material is temporarily secured.

18. In a machine of the character described, a disk adapted to carry the material to be cut, and comprising a plurality of segments each of which is adapted to carry portions of the material to be grooved, and means for securing the segments in position on the disk.

19. In a machine for grooving agates or the like, a disk adapted to carry the agates to be grooved, and comprising segments each of which carries a plurality of agates, and means for securing the segments upon the disk.

20. In a machine for grooving agates or the like, a disk adapted to carry the agates to be grooved, and comprising recessed segments each of which is adapted to have a plurality of agates secured therein, and means for securing the segments upon the disk.

21. In a machine for grooving agates or the like, a disk adapted to carry the agates to be grooved, and comprising recessed segments each of which is arranged to support a plurality of agates adjacent its recessed portion, means for temporarily fixing the agates in position upon the segments, and means for clamping the segments upon the disk.

ORWELL C. REEVES.

Witnesses:
I. A. CROWLEY,
GEORGE R. FRYE.